United States Patent
Seo et al.

(10) Patent No.: US 7,215,636 B2
(45) Date of Patent: May 8, 2007

(54) METHOD OF DETERMINING TRAINING SIGNAL IN OFDM, AND APPARATUS AND METHOD FOR RECEIVING OFDM SIGNAL USING THE TRAINING SIGNAL

(75) Inventors: Bo-Seok Seo, Seoul (KR); Jang-Jin Choi, Gyunggi-Do (KR)

(73) Assignee: Dizipia Inc. (KR)

( * ) Notice: Subject to any disclaimer, the term of this patent is extended or adjusted under 35 U.S.C. 154(b) by 965 days.

(21) Appl. No.: 10/434,002

(22) Filed: May 8, 2003

(65) Prior Publication Data
US 2004/0141457 A1    Jul. 22, 2004

(30) Foreign Application Priority Data
Jan. 18, 2003    (KR) ............... 10-2003-0003455

(51) Int. Cl.
*H04J 11/00* (2006.01)
(52) U.S. Cl. ............. 370/208; 370/335; 370/342; 375/308; 375/355
(58) Field of Classification Search ......... 370/208, 370/335, 342; 375/308, 355
See application file for complete search history.

(56) References Cited

U.S. PATENT DOCUMENTS

| | | | | |
|---|---|---|---|---|
| 5,732,113 | A * | 3/1998 | Schmidl et al. ............ | 375/355 |
| 6,731,595 | B2 * | 5/2004 | Matsumoto ................. | 370/210 |
| 6,816,555 | B2 * | 11/2004 | Sakoda ....................... | 375/260 |
| 2002/0172213 | A1 * | 11/2002 | Laroia et al. ............... | 370/430 |
| 2003/0103445 | A1 * | 6/2003 | Steer et al. ................. | 370/208 |
| 2003/0112743 | A1 * | 6/2003 | You et al. ................... | 370/203 |
| 2003/0131272 | A1 * | 7/2003 | Watts et al. ................. | 713/322 |
| 2003/0169824 | A1 * | 9/2003 | Chayat ........................ | 375/260 |

* cited by examiner

*Primary Examiner*—Danh Le
(74) *Attorney, Agent, or Firm*—Cantor Colburn LLP (57) ABSTRACT

A method of determining a training signal so as to facilitate acquisition of symbol sync, frequency offset estimation, and channel estimation in an orthogonal frequency division multiplexing (OFDM) system, and an apparatus and method for receiving a baseband OFDM signal using the training signal are provided. The method of determining the training signal, which is transmitted from an OFDM transmitter to an OFDM receiver using N subcarriers in order to allow the OFDM receiver to perform symbol synchronization, frequency synchronization, and channel estimation in the OFDM system, includes determining a first training symbol by setting odd-numbered subcarriers to 0 in a frequency domain, obtaining even-numbered subcarriers using M-ary phase-shift keying (M-PSK), and performing differential modulation so that a change in the phase difference between remote two subcarriers is constant; and determining a second training symbol by setting even-numbered subcarriers to 0 in the frequency domain, obtaining odd-numbered subcarriers using M-PSK, and performing differential modulation so that a change in the phase difference between remote two subcarriers is constant. By performing all of symbol timing recovery, frequency offset estimation, and channel estimation using the training signal determined as described above, time taken for frequency offset estimation can be reduced, hardware complexity can be decreased, a frequency acquisition range can be expanded up to ½ of the entire bandwidth, and influence of a multi-path channel can be counterbalanced.

12 Claims, 6 Drawing Sheets

METHOD OF DETERMINING TRAINING SIGNAL IN OFDM, AND APPARATUS AND METHOD FOR RECEIVING OFDM SIGNAL USING THE TRAINING SIGNAL

BACKGROUND OF THE INVENTION

1. Field of the Invention

The present invention relates to orthogonal frequency division multiplexing (OFDM), and more particularly, to a method of determining a training signal so as to facilitate acquisition of symbol sync, frequency offset estimation, and channel estimation in an OFDM system, and an apparatus and method for receiving a baseband OFDM signal using the training signal.

2. Description of the Related Art

Generally, in an OFDM signal, symbols in parallel are transmitted in series, so symbol sync is necessary for an OFDM receiver to acquire the start of an OFDM symbol in order to convert a transmitted serial signal to symbols in parallel. In addition, in an OFDM mode, interchannel interference is caused by a frequency offset between a received carrier frequency and an oscillator frequency of the OFDM receiver, so the OFDM receiver requires a frequency offset estimator for accurately estimating a frequency offset. The OFDM receiver also requires a channel estimator for estimating the gain of a channel.

Among many elements of such an OFDM receiver, the frequency offset estimator most significantly influences the performance and complexity of the OFDM receiver. In the meantime, conventional frequency offset estimation based on an autocorrelation function has an advantage of a small amount of computation but has a disadvantage of a narrow acquisition range for a frequency offset. Conventional frequency offset estimation based on a cross-correlation function has an advantage of no limitation in an acquisition range for a frequency offset but requires to calculate correlation values at each subcarrier, and thus the OFDM receiver is complicated due to a large amount of computation.

In order to allow an OFDM receiver to acquire the start of an OFDM symbol and accurately synchronize a carrier frequency with an oscillator frequency during demodulation of a received signal, an OFDM transmitter transmits a predetermined training signal to the OFDM receiver.

Figure 1:
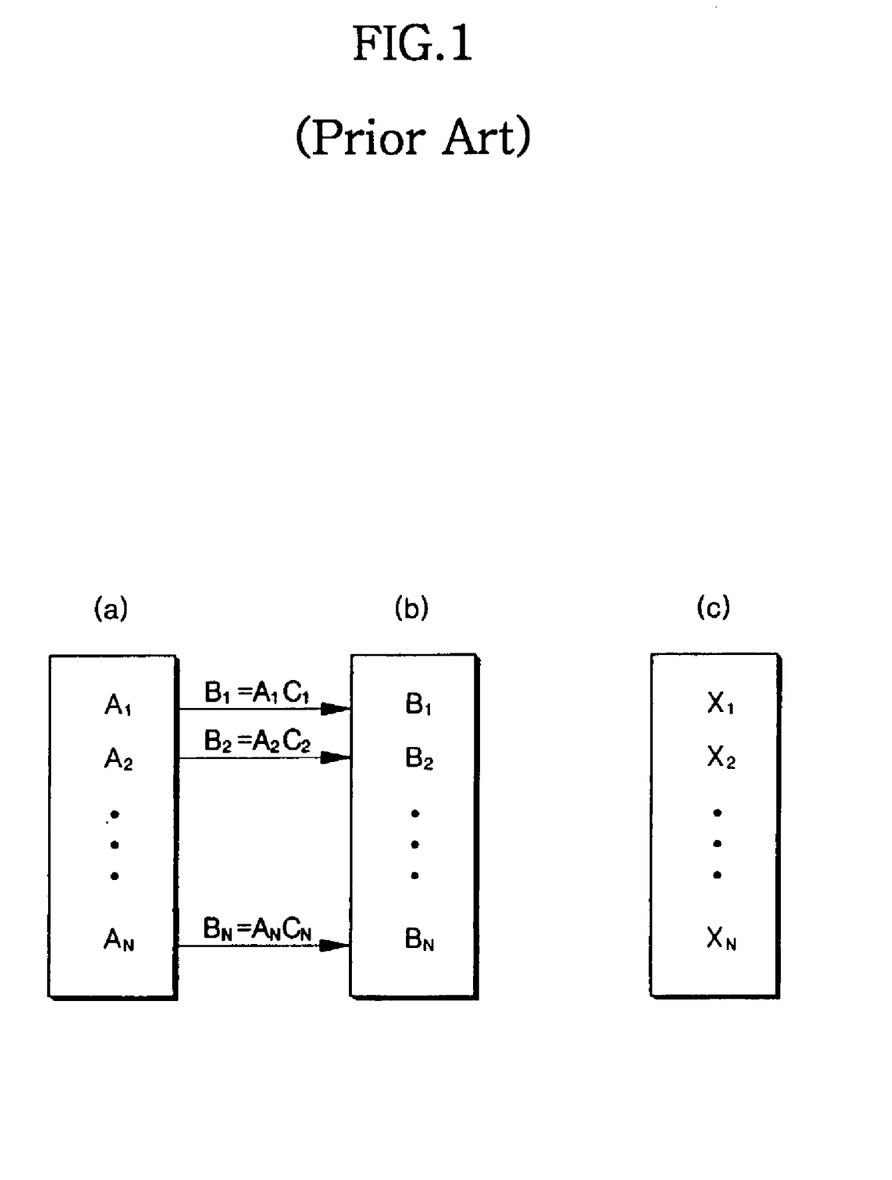
FIG. 1 is a diagram of the structure of a conventional orthogonal frequency division multiplexing (OFDM) training signal.

FIG. 1 shows the structure of a conventional training signal. As shown in FIG. 1, an OFDM transmitter using N subcarriers allocates data $A_1$ through $A_N$ to the N subcarriers, respectively, in a frequency domain during a first symbol period, thereby structuring a first training symbol shown in FIG. 1(a), and allocates data $B_1$ through $B_N$ to the N subcarriers, respectively, during a second symbol period, thereby structuring a second training symbol shown in FIG. 1(b). The data $A_1$ through $A_N$ of the first training symbol are related with the data $B_1$ through $B_N$ of the second training symbol by Formula (1).

$$B_k = A_k C_k, \quad k=1 \sim N \tag{1}$$

More accurately, N indicates the size of inverse fast Fourier transform (IFFT), which implements an OFDM modulator, and since a guard band, in which a subcarrier is not transmitted, is set at the edge of a transmission band in order to facilitate filtering and avoid interference from a signal in an adjacent band, the number of actually used subcarriers should be expressed by $L \leq N$. However, hereinafter, for clarity of the description, it is assumed that $L=N$, and thus the number of subcarriers is denoted by N.

Accordingly, the OFDM transmitter repeatedly transmits the same data over the same subcarriers during the two symbol periods when $C_k \neq 1$ or transmits the first data and the second data particularly related with the first data over the same subcarriers during the two symbol periods when $C_k \neq 1$. Thereafter, the OFDM transmitter transmits data $X_1$ through $X_N$ of a normal data symbol shown in FIG. 1(c) over the respective subcarriers. Hereinafter, a set of the first training symbol and the second training symbol is referred to as a "training signal".

Figure 2:
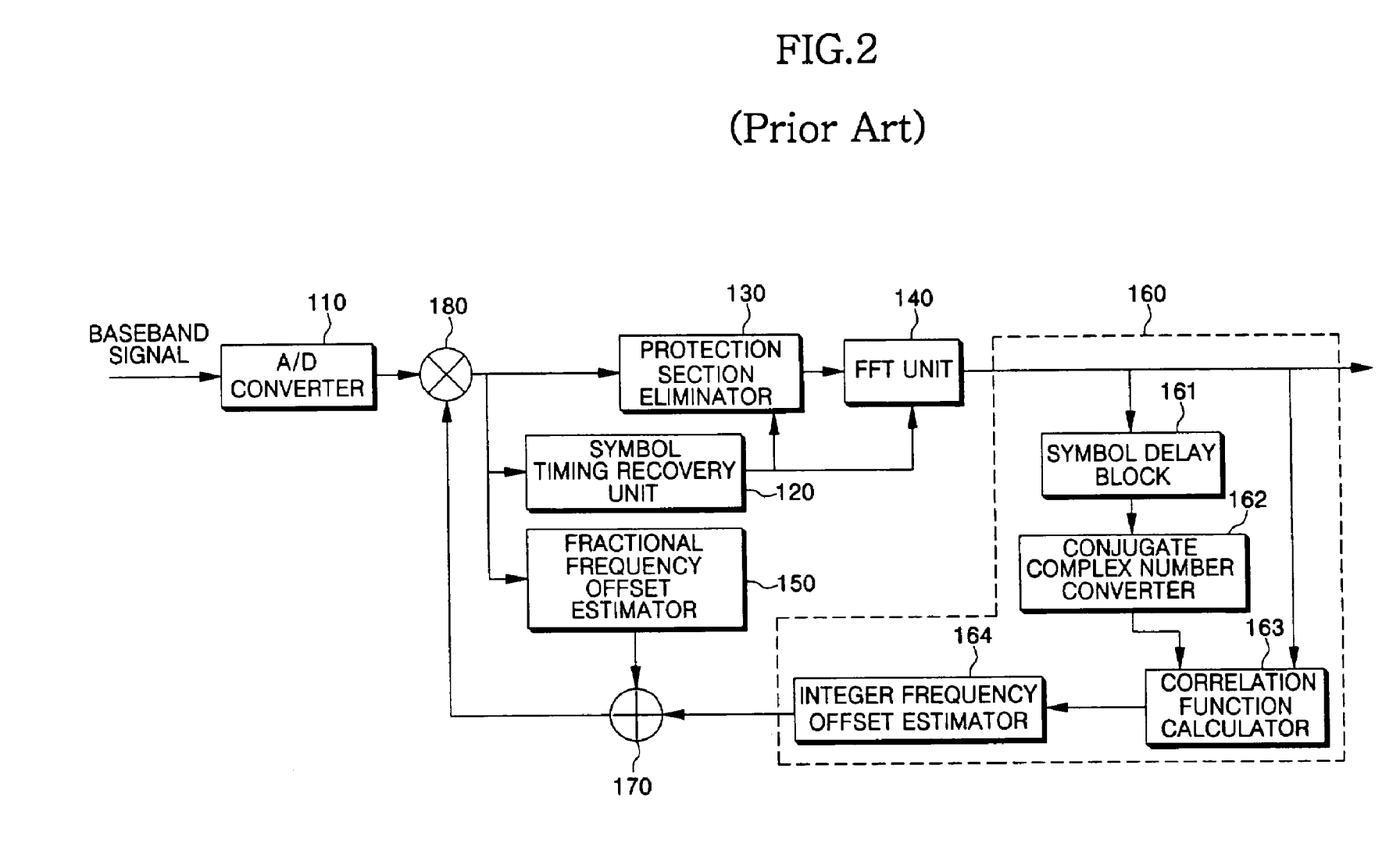
FIG. 2 is a diagram of a conventional OFDM receiver.

A conventional OFDM receiver recovers symbol timing using the first and second training symbols and estimates a frequency offset. As shown in FIG. 2, the conventional OFDM receiver includes an analog-to-digital (A/D) converter 110, which converts a baseband analog signal to a digital signal; a symbol timing recovery unit 120, which detects the start of an OFDM symbol; a guard interval eliminator 130, which eliminates a guard interval from the OFDM symbol using the recovered symbol timing; a fast Fourier transform (FFT) unit 140; a fractional frequency offset estimator 150, which estimates a frequency offset smaller than subcarrier spacing; an integer frequency offset estimation unit 160, which estimates a frequency offset that is an integer multiple of the subcarrier spacing; an adder 170, which adds a fractional frequency offset and an integer frequency offset to calculate an entire frequency offset; and a multiplier 180, which configures the entire frequency offset into a complex exponential function indicating a change in a phase and multiplies the complex exponential function by the output of the A/D converter 110.

The integer frequency offset estimation unit 160 includes a symbol delay block 161, a conjugate complex number calculator 162, a correlation function calculator 163 calculating a correlation function using a delayed received symbol and a received symbol not delayed, and an integer frequency offset estimator 164.

In operation of the conventional OFDM receiver shown in FIG. 2, when an OFDM transmitter transmits a training signal, which is configured as shown in FIG. 1, periodically or transmits the training signal by attaching it to the front of a data symbol when signal transmission is newly started, the OFDM receiver receives a signal transmitted from the OFDM transmitter and demodulates the signal into a baseband analog signal. Thereafter, the A/D converter 110 converts the analog signal to a digital signal. The symbol timing recovery unit 120 detects the start of a symbol from the digital signal in order to acquire symbol sync. The guard interval eliminator 130 eliminates a guard interval in a front portion of an OFDM symbol using the detected start of the symbol. The FFT unit 140 performs FFT on the OFDM symbol from which the guard interval has been eliminated.

Simultaneously with the acquisition of symbol sync by the symbol timing recovery unit 120, the fractional frequency offset estimator 150 estimates a frequency offset $\Delta f_1$ less than subcarrier spacing in the digital signal. The repetitive characteristic of the training signal is used for the symbol sync acquisition of the symbol timing recovery unit 120 and the fractional frequency offset estimation of the fractional frequency offset estimator 150.

The integer frequency offset estimation unit 160 receives a signal output from the FFT unit 140 and estimates a frequency offset that is an integer multiple of the subcarrier spacing. More specifically, the symbol delay block 161 delays a first training symbol output from the FFT unit 140 by a unit symbol period. The conjugate complex number calculator 162 calculates a conjugate of the first training symbol. The correlation function calculator 163 receives a signal output from the conjugate complex number calculator 162, i.e., the conjugate of the first training symbol, simultaneously with a second training symbol output from the FFT unit 140 and calculates a correlation function with respect to the second training symbol and the conjugate of the first training symbol in units of data samples. The integer frequency offset estimator 164 obtains a position, at which a correlation value is maximum, from the correlation function and estimates an integer frequency offset $\Delta f_2$, which is an integer multiple of the subcarrier spacing.

The adder 170 adds the frequency offsets respectively output from the fractional frequency offset estimator 150 and the integer frequency offset estimation unit 160. Thereafter, the multiplier 180 configures the entire frequency offset $\Delta f_1 + \Delta f_2$ into a complex exponential function $e^{-j2\pi(\Delta f_1 + \Delta f_2)n/N}$ and multiplies the complex exponential function by the digital signal output from the A/D converter 110 so that a frequency offset occurring between a carrier frequency and a frequency of an oscillator in the OFDM receiver during demodulation can be corrected.

In addition, the conventional OFDM receiver estimates an integer frequency offset and simultaneously estimates channel gain in the frequency domain. Then, conventional OFDM receiver obtains accurate channel gain with the cyclic shifting of a subchannel as many times as the estimated integer frequency offset.

As described above, in order to estimate an integer frequency offset between an oscillator frequency and a carrier frequency, the conventional OFDM receiver calculates correlation values by performing correlation between sequential two OFDM training symbols in units of data samples and obtains a frequency shift that gives the maximum correlation value. Such conventional technology has the following problems.

Firstly, in the case of an OFDM system using N subcarriers, when an integer frequency offset is estimated, a maximum of N-1 correlation values must be calculated in order to calculate spacing giving the maximum correlation value. In this case, the amount of calculation is great, so it takes a long period of time to acquire sync in an OFDM receiver.

Secondly, since correlation values must be calculated with respect to samples one by one in order to obtain a correlation function, the circuit of the OFDM receiver is complex.

Due to a great amount of calculation and high complexity, the conventional OFDM receiver is not suitable to mobile communication systems using portable terminals.

SUMMARY OF THE INVENTION

The present invention provides a method of determining a training signal in an orthogonal frequency division multiplexing (OFDM) system designed such that a correlation value between subcarriers is proportional to a frequency offset.

The present invention also provides an apparatus and method for receiving an OFDM signal, by which a frequency offset between a carrier frequency and an oscillator frequency can be simply estimated throughout a wide range without being influenced by channel characteristics, using the training signal, and the same training signal can be used for symbol timing recovery and channel gain estimation.

According to an aspect of the present invention, there is provided a method of determining a training signal, which is transmitted from an OFDM transmitter to an OFDM receiver using N subcarriers in order to allow the OFDM receiver to perform symbol synchronization, frequency synchronization, and channel estimation in an OFDM system. The method includes determining a first training symbol by setting odd-numbered subcarriers to 0 in a frequency domain, obtaining even-numbered subcarriers using M-ary phase-shift keying (M-PSK), and performing differential modulation so that a change in the phase difference between remote two subcarriers is constant; and determining a second training symbol by setting even-numbered subcarriers to 0 in the frequency domain, obtaining odd-numbered subcarriers using M-PSK, and performing differential modulation so that a change in the phase difference between remote two subcarriers is constant.

According to another aspect of the present invention, there is provided an OFDM receiver including an analog-to-digital (A/D) converter, which converts a baseband analog signal to a digital signal; a symbol timing recovery unit, which detects a point, at which a correlation value of a first or second training symbol included in an output signal of the A/D converter is maximum, and determines the point as a start of an OFDM symbol or detects points, at which correlation values of the respective first and second training symbols included in the output signal of the A/D converter are maximum, and determines the start of the OFDM symbol using the detected two points; a fractional frequency offset estimation unit, which estimates a frequency offset smaller than subcarrier spacing using a training signal included in the output signal of the A/D converter; a first multiplier, which multiplies an exponential function correcting the estimated fractional frequency offset by the output signal of the A/D converter; a guard interval eliminator, which eliminates a guard interval from the OFDM symbol based on the start of the OFDM symbol; a fast Fourier transform (FFT) unit, which receives and converts N serial data, from which the guard interval has been eliminated, to parallel data and performs FFT on the parallel data; an even frequency offset estimation unit, which estimates the even part of a frequency offset using the fast Fourier transformed training signal and previously stored conjugates of respective first and second difference signals; a subcarrier cyclic shifter, which cyclic shifts the fast Fourier transformed OFDM symbol by the estimated even part of the frequency offset to correct an even frequency offset; a channel estimator, which obtains channel gain using a ratio between a previously stored fast Fourier transformed training signal and the received fast Fourier transformed training signal; and a channel equalizer, which divides an output signal of the subcarrier cyclic shifter by the estimated channel gain.

According to still another aspect of the present invention, there is provided a method of receiving an OFDM signal. The method includes (a) demodulating a received signal into a baseband analog signal and converts the baseband analog signal to a digital signal; (b) detecting a point, at which a correlation value of a first or second training symbol included in the digital signal obtained in step (a) is maximum, and determining the point as a start of an OFDM symbol or detecting points, at which correlation values of the respective first and second training symbols included in the digital signal obtained in step (a) are maximum, and determining the start of the OFDM symbol using the detected two points; (c) estimating a fractional frequency offset smaller than subcarrier spacing using a training signal included in the digital signal obtained in step (a) and multiplying an exponential function, which rotates a phase in an opposite direction to a phase rotation due to the fractional frequency offset, by the digital signal to correct the estimated fractional frequency offset; (d) eliminating a guard interval from the OFDM symbol based on the start of the OFDM symbol and performing FFT on the OFDM symbol from which the guard interval has been eliminated; (e) estimating the even part of a frequency offset using the fast Fourier transformed training signal and a conjugate of a difference signal of the training signal and cyclic shifting the fast Fourier transformed OFDM symbol by the estimated even part of the frequency offset to correct an even frequency offset; and (f) obtaining channel gain using a ratio between a previously stored fast Fourier transformed training signal and the received fast Fourier transformed training signal and performing channel equalization by dividing the fast Fourier transformed OFDM symbol by the channel gain.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described in detail with reference to the attached drawings.

Figure 3:
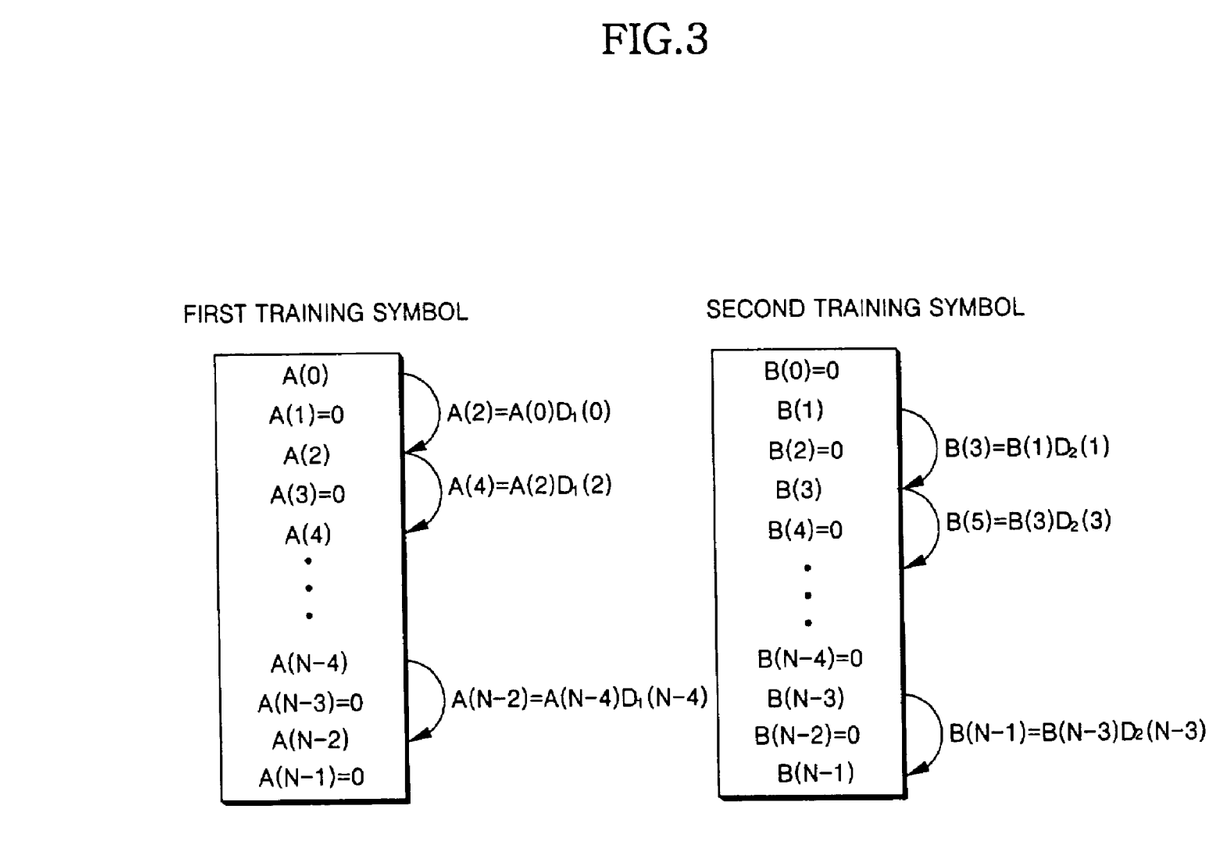
FIG. 3 is a diagram of the structure of an OFDM training signal according to an embodiment of the present invention.

FIG. 3 shows the structure of a training signal determined using a method of determining a training signal according to an embodiment of the present invention. Referring to FIG. 3, a training signal, which is transmitted from an orthogonal frequency division multiplexing (OFDM) transmitter to an OFDM receiver using N subcarriers in order to allow the OFDM receiver to perform symbol synchronization, frequency synchronization, and channel estimation, is composed of two training symbols: a first training symbol in which data is allocated to only even-numbered subcarriers in a frequency domain, and a second training symbol in which data is allocated to only odd-numbered subcarriers in the frequency domain.

The first training symbol is configured such that odd-numbered subcarriers are set to 0 and even-numbered subcarriers are obtained using M-ary phase-shift keying (M-PSK). In other words, a k-th subcarrier A(k) can be expressed by Formula (2).

$$A(k) = \begin{cases} e^{j\frac{2\pi}{M}m_1(k)}, & k = 0, 2, \ldots, N-2 \\ 0, & k = 1, 3, \ldots, N-1 \end{cases} \quad (2)$$

Here, $m_1(k) \in \{0, 1, \ldots, M-1\}$, and $m_1(k)$ is determined such that adjacent even-numbered subcarriers satisfy Formula (3).

$$m_1(k+4) - 2m_1(k+2) + m_1(k) = 1, k = 0, 2, \ldots, N-6, \quad (3)$$

A relationship between adjacent even-numbered subcarriers can be expressed using a first difference signal $D_1(k)$ determined depending on a phase difference, as shown in Formula (4).

$$A((k+2)_N) = A(k)D_1(k), k = 0, 2, \ldots, N-2 \quad (4)$$

Here, $(\ )_N$ denotes an arithmetic modulo N, and thus, hereinafter, the subscript N will be omitted.

The second training symbol is configured such that even-numbered subcarriers are set to 0 and odd-numbered subcarriers are obtained using M-PSK. In other words, a subcarrier B(k) can be expressed by Formula (5).

$$B(k) = \begin{cases} 0, & k = 0, 2, \ldots, N-2 \\ e^{j\frac{2\pi}{M}m_2(k)}, & k = 1, 3, \ldots, N-1 \end{cases} \quad (5)$$

Here, $m_2(k) \in \{0, 1, \ldots, M-1\}$, and $m_2(k)$ is determined such that adjacent odd-numbered subcarriers satisfy Formula (6).

$$m_2(k+4) - 2m_2(k+2) + m_2(k) = -1, k = 1, 3, \ldots, N-5 \quad (6)$$

A relationship between adjacent odd-numbered subcarriers can be expressed using a second difference signal $D_2(k)$ determined depending on a phase difference, as shown in Formula (7).

$$B(k+2) = B(k)D_2(k), k = 1, 3, \ldots, N-1 \quad (7)$$

Formulae (3) and (6) determining the subcarriers of the respective first and second training symbols can be rewritten as Formula (8), which indicates performing differential modulation so that a change in the phase difference between remote two subcarriers is constant.

$$\{m_l(k+4) - m_l(k+2)\} - \{m_l(k+2) - m_l(k)\} = \pm 1, (l=1,2) \quad (8)$$

The signs of the phase differences with respect to the first and second training symbols are set to be opposite in order to counterbalance the influences of channel and timing errors on the phase differences. For the first and second training symbols, $m_1(k)$ and $m_2(k)$ are determined to be different depending on initial values $m_1(0)$ and $m_1(2)$ and initial values $m_2(1)$ and $m_2(3)$, but an OFDM receiver including a frequency offset estimator has constant performance regardless of the initial values.

A(k), B(k), $D_1(k)$, and $D_2(k)$ are data that has been predetermined and known to both OFDM transmitter and receiver. A(k), B(k), and the conjugate $D^*_l(k)$ of $D_l(k)$ (l=1, 2) are stored in a memory of the OFDM receiver and used for symbol synchronization, frequency offset estimation, and channel estimation.

Figure 4:
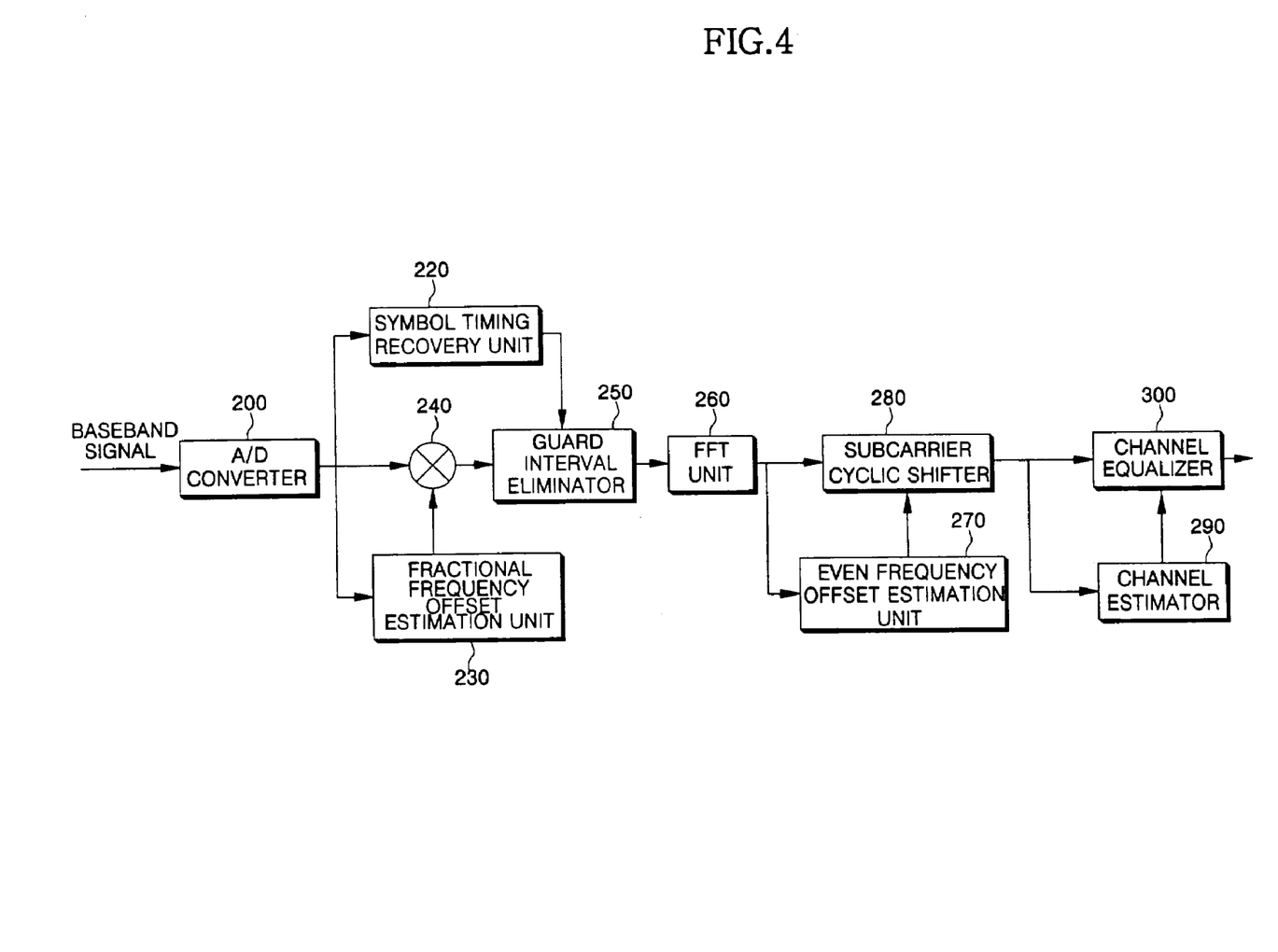
FIG. 4 is a diagram of an OFDM receiver according to an embodiment of the present invention.

Referring to FIG. 4, an OFDM receiver according to an embodiment of the present invention includes an analog-to-digital (A/D) converter 200, which converts a received baseband analog signal to a digital signal; a symbol timing recovery unit 220, which detects the start of an OFDM symbol; a fractional frequency offset estimation unit 230, which estimates a frequency offset smaller than subcarrier spacing using a training signal; a first multiplier 240, which multiplies an exponential function correcting the estimated fractional frequency offset by the output signal of the A/D converter 200; a guard interval eliminator 250, which eliminates a guard interval from the OFDM symbol based on the detected start of the OFDM symbol; a fast Fourier transform (FFT) unit 260, which performs FFT on the OFDM symbol from which the guard interval has been eliminated; an even frequency offset estimation unit 270, which estimates the even part of a frequency offset using a fast Fourier transformed training signal and the previously stored conjugates of respective first and second difference signals; a subcarrier cyclic shifter 280, which cyclic shifts a fast Fourier transformed signal by the estimated even part of the frequency offset; a channel estimator 290, which obtains channel gain using a ratio between a previously stored training signal and the received training signal; and a channel equalizer 300, which divides a signal, for which an even frequency offset is corrected, by the estimated channel gain.

Figure 5:
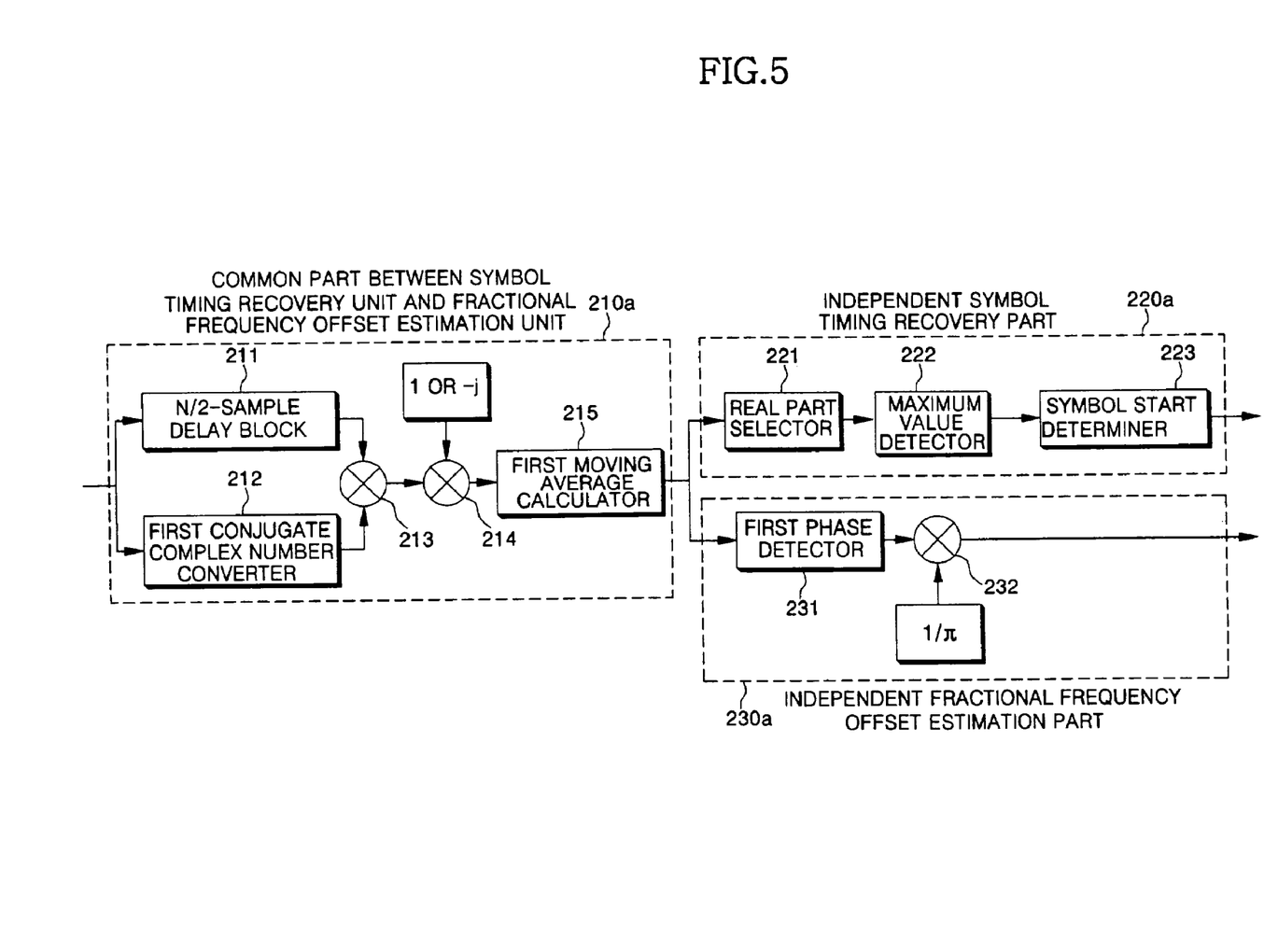
FIG. 5 is a detailed diagram of a symbol timing recovery unit and a fractional frequency offset estimation unit in the OFDM receiver according to the embodiment of the present invention.

Referring to FIG. 5, in the case of an OFDM receiver using N-point FFT, the symbol timing recovery unit 220 and the fractional frequency offset estimation unit 230 share a common part 210a including an N/2 sample delay block 211, which delays a first training symbol and/or a second training symbol included in the output signal of the A/D converter 200 by an N/2-sample data period; a first conjugate complex number converter 212, which obtains the conjugates of data within the first training symbol and/or the second training symbol included in the output signal of the A/D converter 200; a second multiplier 213, which multiplies the output signal of the N/2 sample delay block 211 by the output signal of the first conjugate complex number converter 212 to obtain a correlation value; a third multiplier 214, which selectively multiplies the output signal of the second multiplier 213 by 1 or –j; and a first moving average calculator 215, which calculates an average correlation value with respect to the output signal of the third multiplier 214 during a predetermined period. In addition to the common part 210a, the symbol timing recovery unit 220 includes an independent symbol timing recovery part 220a including a real part selector 221, which takes the real part of the output signal of the first moving average calculator 215; a maximum value detector 222, which detects a first estimate value $d_1$ giving the maximum correlation value of the first training symbol and/or a second estimate value $d_2$ giving the maximum correlation value of the second training symbol; and a symbol start determiner 223, which determines the first estimate value or an average of the first and second estimate values as the start of the symbol. The fractional frequency offset estimation unit 230 additionally includes an independent fractional frequency offset estimation part 230a including a first phase detector 231, which detects the phase of an average correlation value of the first training symbol and the phase of an average correlation value of the second training symbol from the output signal of the first moving average calculator 215 and calculates an average of the detected phases; and a fourth multiplier 232, which multiplies the average calculated by the first phase detector 231 by $1/\pi$.

Figure 6:
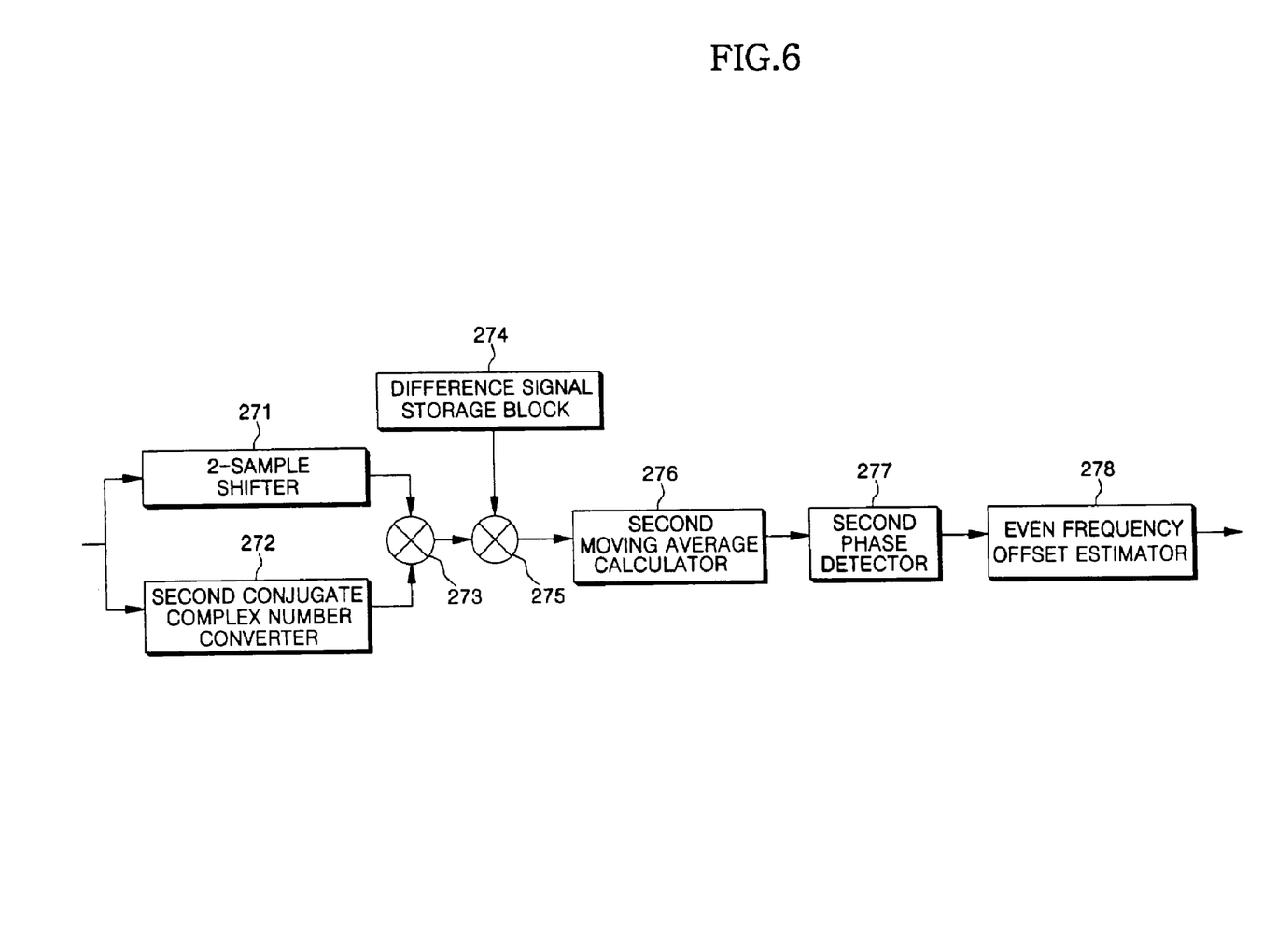
FIG. 6 is a detailed diagram of an even frequency offset estimation unit in the OFDM receiver according to the embodiment of the present invention.

Referring to FIG. 6, the even frequency offset estimation unit 270 includes a 2-sample shifter 271, which cyclic shifts the fast Fourier transformed first training symbol and the fast Fourier transformed second training symbol by a 2-sample data period; a second conjugate complex number converter 272, which obtains the conjugate of the fast Fourier transformed first training symbol and the conjugate of the fast Fourier transformed second training symbol; a fifth multiplier 273, which multiplies the output data of the 2-sample shifter 271 by the output data of the second conjugate complex number converter 272; a difference signal storage block 274, which stores the conjugate $D^*_f(k)$ of a first difference signal $D_f(k)$ defined by a phase difference between adjacent even-numbered subcarriers and the conjugate $D^*_2(k)$ of a second difference signal $D_2(k)$ defined by a phase difference between adjacent odd-numbered subcarriers; a sixth multiplier 275, which multiplies data that is output from the fifth multiplier 273 with respect to the first training symbol by the conjugate of the first difference signal, and multiplies data that is output from the fifth multiplier 273 with respect to the second training symbol by the conjugate of the second difference signal; a second moving average calculator 276, which calculates an average of the output data of the sixth multiplier 275 during a 1-symbol period; a second phase detector 277, which detects the phase of an average obtained with respect to the first training symbol and the phase of an average obtained with respect to the second training symbol; and an even frequency offset estimator 278, which estimates an even value, which is closest to the result of multiplying a difference between the detected phases by $M/2\pi$, as an even frequency offset.

The following description concerns the operation of the OFDM receiver according to the embodiment of the present invention shown in FIGS. 4 through 6.

When an OFDM transmitter (not shown) transmits a training signal, which is configured as shown in FIG. 3, periodically or transmits the training signal by attaching it to the front of a data symbol when signal transmission is newly started, the OFDM receiver receives the training signal transmitted from the OFDM transmitter and demodulates the training signal into a baseband analog signal. Thereafter, the A/D converter 200 converts the baseband analog signal to a digital signal. The symbol timing recovery unit 220 detects the start of an OFDM symbol from the digital signal in order to acquire symbol sync. The guard interval eliminator 250 eliminates a guard interval from the OFDM symbol based on the detected start of the OFDM symbol.

Simultaneously with the acquisition of symbol sync by the symbol timing recovery unit 220, the fractional frequency offset estimator 230 estimates a fractional frequency offset $\Delta f_1$ less than subcarrier spacing in the digital signal. The first multiplier 240 configures the estimated fractional frequency offset $\Delta f_1$ into a complex exponential function $e^{j2\pi\Delta f_1 n/N}$ and multiplies it by the digital signal from the A/D converter 200 to correct the fractional part of a normalized frequency offset.

The FFT unit 260 performs conversion of N serial data to parallel data with respect to the OFDM symbol from which the guard interval has been removed and performs FFT on the parallel data. Thereafter, the even frequency offset estimation unit 270 estimates the even part $\Delta f_2$ of the normalized frequency offset. Then, the subcarrier cyclic shifter 280 shifts the position of a subcarrier by the estimated even number.

Thereafter, the channel estimator 290 compares data, for which the frequency offset is completely corrected, with previously stored training data to estimate channel gain H(k) (k=0, 1, . . . , N–1). Then, the channel equalizer 300 corrects received data using the estimated channel gain.

Hereinafter, symbol synchronization, fractional frequency offset estimation, even frequency offset estimation, and channel equalization will be described using mathematical formulae.

As for symbol synchronization, when a received training signal with respect to a first training symbol is represented by $y_1(n)$ and a received training signal with respect to a second training symbol is represented by $y_2(n)$, a point $d_1$ at which the real part of a correlation value of the first training symbol is maximum is determined as symbol sync used for acquiring the start d of an OFDM symbol, as shown in Formula (9).

$$d_1 = \max_{d} \text{Re}\left\{\sum_{n=0}^{N/2-1} y_1^*(n+d)y_1(n+d+N/2)\right\} \quad (9)$$

Here, Re{x} denotes the real part of x.

For more accurate symbol synchronization, a point $d_2$, at which the real part of a correlation value of the second training symbol is maximum, can also be obtained, as shown in Formula (10).

$$d_2 = \max_{d} \text{Re}\left\{-j\sum_{n=0}^{N/2-1} y_2^*(n+d)y_2(n+d+N/2)\right\} \quad (10)$$

Here, the start d of the OFDM symbol is an average of the two estimated values $d_1$ and $d_2$, as shown in Formula (11).

$$d = \text{int}\left[\frac{d_1+d_2}{2}\right] \quad (11)$$

Here, int[x] denotes the closest integer to x.

Hereinafter, it is assumed that d=0.

If the start d is determined, a guard interval is removed from the received signal using the start d to take a pure OFDM symbol. The pure OFDM symbol is processed by a fractional frequency offset estimator and a serial-to-parallel converter and is then input to a FFT unit.

The following description concerns fractional frequency offset estimation.

The fractional part $\Delta f_1$, of a frequency offset is obtained by calculating frequency offsets respectively from the first and second training symbols using Formulae (12) and (13) and then calculating an average of the two frequency offsets $\Delta f_1^{(1)}$ and $\Delta f_1^{(2)}$ using Formula (14).

$$\Delta f_1^{(1)} = \frac{1}{\pi}\arg\left\{\sum_{n=0}^{N/2-1} y_1^*(n)y_1(n+N/2)\right\} \quad (12)$$

$$\Delta f_1^{(2)} = \frac{1}{\pi}\arg\left\{-j\sum_{n=0}^{N/2-1} y_2^*(n)y_2(n+N/2)\right\} \quad (13)$$

$$\Delta f_1 = \frac{\Delta f_1^{(1)} + \Delta f_1^{(2)}}{2} \quad (14)$$

Thereafter, an exponential function, for rotating a phase in an opposite direction to a phase rotation due to the fractional part of the frequency offset, is generated, as shown in Formula (15), and then multiplied by the output signal of an A/D converter so that a fractional frequency offset can be corrected.

$$\Delta f_1 \Rightarrow e^{j2\pi \Delta f_1 n/N} \quad (15)$$

Hereinafter, for clarity of the description, the received signal for which the fractional frequency offset has been corrected is still represented by $y_l(n)$.

The following description concerns even frequency offset estimation.

In order to estimate the even part $\Delta f_2$ of the frequency offset, the results $Y_1(k)$ and $Y_2(k)$ of performing FFT on the first and second training symbols are used.

$$P_1 = \frac{2}{N}\sum_{k \in K_1} Y_1^*(k)Y_1((k+2)_N)D_1^*(k) \quad (16)$$

$$P_2 = \frac{2}{N}\sum_{k \in K_2} Y_2^*(k)Y_2((k+2)_N)D_2^*(k) \quad (17)$$

$$\Delta f_2 = \text{even}\left[\frac{M}{2\pi}\{\arg(P_2) - \arg(P_1)\}\right] \quad (18)$$

Here, $K_1=\{0, 2, \ldots, N-2\}$ and $K_2=\{1, 3, \ldots, N-1\}$. In addition, arg{x} is a function expressing the phase of a complex number x, and even[x] denotes an even number closest to the number x. The FFT output is cyclic shifted by the estimated even part of the frequency offset so that accurate data for which both the fractional part and the even part of the frequency offset have been corrected can be obtained.

The following description concerns channel equalization.

Channel equalization, through which a transmitted signal after being attenuated or amplified by channel gain is recovered to the original signal, is implemented by estimating channel gain and then dividing the FFT output by the estimated channel gain.

The channel gain can be estimated using the ratio between the previously stored training signal and the currently received training signal. As shown in Formula (19), a channel gain H(k) with respect to even-numbered subcarriers (where k is an even number) is obtained using the FFT output with respect to the first training symbol, and a channel gain H(k) with respect to odd-numbered subcarriers (where k is an odd number) is obtained using the FFT output with respect to the second training symbol.

$$H(k) = \begin{cases} \frac{Y_1(k)}{A(k)}, & k = 0, 2, \ldots, N-2 \\ \frac{Y_2(k)}{B(k)}, & k = 1, 3, \ldots, N-1 \end{cases} \quad (19)$$

Thereafter, a normal data signal transmitted following the training signal is divided by the estimated channel gain H(k), thereby implementing channel equalization.

As described above, according to the present invention, the number of calculations of correlation values necessary to estimate both the integer part and the fractional part of a frequency offset can be decreased to a minimum of three, so a time delay caused by a lot of calculations can be reduced. Accordingly, the present invention can be applied to implement apparatuses such as mobile communication systems sensitive to a time delay.

In addition, the number of calculations of correlation values necessary to estimate the integer part of a frequency offset can be decreased to a minimum of two, so the complexity of a circuit for estimating an integer frequency offset is remarkably decreased. Accordingly, the present invention can provide an OFDM receiver having remarkably low complexity.

Moreover, according to the present invention, the acquisition range for a frequency offset can be expanded up to ½ of the entire *bandwidth*, and the frequency offset can be estimated without being influenced by channel *characteristics*.

Since a training signal used for frequency offset estimation can simultaneously used for symbol timing recovery and channel estimation, the entire training signal is composed of only two OFDM symbols without an additional training signal. Accordingly, overhead for the training signal can be reduced.

What is claimed is:

1. A method of determining a training signal in an orthogonal frequency division multiplexing (OFDM) system, the training signal being transmitted from an OFDM transmitter to an OFDM receiver using N subcarriers in order to allow the OFDM receiver to perform symbol synchronization, frequency synchronization, and channel estimation, the method comprising:

determining a first training symbol by setting odd-numbered subcarriers to 0 in a frequency domain, obtaining even-numbered subcarriers using M-ary phase-shift keying (M-PSK), and performing differential modulation so that a change in the phase difference between remote two subcarriers is constant; and determining a second training symbol by setting even-numbered subcarriers to 0 in the frequency domain, obtaining odd-numbered subcarriers using M-PSK, and performing differential modulation so that a change in the phase difference between remote two subcarriers is constant.

2. The method of claim 1, wherein each subcarrier A(k) for the first training symbol is expressed by:

$$A(k) = \begin{cases} e^{j\frac{2\pi}{M}m_1(k)}, & k = 0, 2, \ldots, N-2 \\ 0, & k = 1, 3, \ldots, N-1 \end{cases},$$

wherein $m_1(k) \in \{0, 1, \ldots, M-1\}$, and adjacent even-numbered subcarriers are related by $m_1(k+4) - 2m_1(k+2) + m_1(k) = 1$ where $k = 0, 2, \ldots, N-6$; and each subcarrier B(k) for the second training symbol is expressed by:

$$B(k) = \begin{cases} 0, & k = 0, 2, \ldots, N-2 \\ e^{j\frac{2\pi}{M}m_2(k)}, & k = 1, 3, \ldots, N-1 \end{cases},$$

wherein $m_2(k) \in \{0, 1, \ldots, M-1\}$, and adjacent odd-numbered subcarriers are related by $m_2(k+4) - 2m_2(k+2) + m_2(k) = -1$ where $k = 1, 3, \ldots, N-5$.

3. A method of receiving an orthogonal frequency division multiplexing (OFDM) signal using a training signal determined by the method of claim 2, the method comprising:

(a) demodulating a received signal into a baseband analog signal and converts the baseband analog signal to a digital signal;

(b) detecting a point, at which a correlation value of a first or second training symbol included in the digital signal obtained in step (a) is maximum, and determining the point as a start of an OFDM symbol or detecting points, at which correlation values of the respective first and second training symbols included in the digital signal obtained in step (a) are maximum, and determining the start of the OFDM symbol using the detected two points;

(c) estimating a fractional frequency offset smaller than subcarrier spacing using the training signal included in the digital signal obtained in step (a) and multiplying an exponential function, which rotates a phase in an opposite direction to a phase rotation due to the fractional frequency offset, by the digital signal to correct the estimated fractional frequency offset;

(d) eliminating a guard interval from the OFDM symbol based on the start of the OFDM symbol and performing fast Fourier transform (FFT) on the OFDM symbol from which the guard interval has been eliminated;

(e) estimating the even part of a frequency offset using the fast Fourier transformed training signal and a conjugate of a difference signal of the training signal and cyclic shifting the fast Fourier transformed OFDM symbol by the estimated even part of the frequency offset to correct an even frequency offset; and (f) obtaining channel gain using a ratio between a previously stored fast Fourier transformed training signal and the received fast Fourier transformed training signal and performing channel equalization by dividing the fast Fourier transformed OFDM symbol by the channel gain.

4. The method of claim 3, wherein in step (b), when the received training signal with respect to the first training symbol is represented by $y_1(n)$, a value $d_1$ calculated using the following formula is determined as the start d of the OFDM symbol:

$$d_1 = \max_d \text{Re}\left\{\sum_{n=0}^{N/2-1} y_1^*(n+d)y_1(n+d+N/2)\right\},$$

where Re{x} denotes the real part of x.

5. The method of claim 3, wherein in step (b), when the received training signal with respect to the first training symbol is represented by $y_1(n)$ and the received signal with respect to the second training symbol is represented by $y_2(n)$, a value d calculated using the following formulae is determined as the start of the OFDM symbol:

$$d_1 = \max_d \text{Re}\left\{\sum_{n=0}^{N/2-1} y_1^*(n+d)y_1(n+d+N/2)\right\},$$

$$d_2 = \max_d \text{Re}\left\{-j\sum_{n=0}^{N/2-1} y_2^*(n+d)y_2(n+d+N/2)\right\}, \text{ and}$$

$$d = int\left[\frac{d_1 + d_2}{2}\right],$$

where Re{x} denotes the real part of x and int[x] denotes the closest integer to x.

6. The method of claim 3, wherein in step (c), when the received training signal with respect to the first training symbol is represented by $y_1(n)$ and the received signal with respect to the second training symbol is represented by $y_2(n)$, the fractional frequency offset 66 $f_1$ is estimated using the following formulae:

$$\Delta f_1^{(1)} = \frac{1}{\pi} \arg\left\{ \sum_{n=0}^{N/2-1} y_1^*(n) y_1(n+N/2) \right\},$$

$$\Delta f_1^{(2)} = \frac{1}{\pi} \arg\left\{ -j \sum_{n=0}^{N/2-1} y_2^*(n) y_2(n+N/2) \right\}, \text{ and}$$

$$\Delta f_1 = \frac{\Delta f_1^{(1)} + \Delta f_1^{(2)}}{2},$$

where arg{x} is a function expressing a phase of a complex number x.

7. The method of claim 3, wherein in step (e), when the results of performing FFT on the first and second training symbols are respectively represented by $y_1(k)$ and $Y_2(k)$, the even part $\Delta f_2$ of the frequency offset is estimated using the following formulae:

$$P_1 = \frac{2}{N} \sum_{k \in K_1} Y_1^*(k) Y_1((k+2)_N) D_1^*(k),$$

$$P_2 = \frac{2}{N} \sum_{k \in K_2} Y_2^*(k) Y_2((k+2)_N) D_2^*(k), \text{ and}$$

$$\Delta f_2 = \text{even}\left[ \frac{M}{2\pi} \{\arg(P_2) - \arg(P_1)\} \right],$$

where $K_1 = \{0, 2, \ldots, N-2\}$, $K_2 = \{1, 3, \ldots, N-1\}$, $(\ )_N$ denotes an arithmetic modulo N, arg{x} is a function expressing a phase of a complex number x, and even[x] denotes an even number closest to the number x.

8. The method of claim 3, wherein in step (f), when the results of performing FFT on the first and second training symbols are respectively represented by $Y_1(k)$ and $Y_2(k)$, the channel gain H(k) is obtained using the following formula:

$$H(k) = \begin{cases} \frac{Y_1(k)}{A(k)}, & k = 0, 2, \ldots, N-2 \\ \frac{Y_2(k)}{B(k)}, & k = 1, 3, \ldots, N-1 \end{cases}.$$

9. An orthogonal frequency division multiplexing (OFDM) receiver using a training signal determined by the method of claim 1, the OFDM receiver comprising:
an analog-to-digital (A/D) converter, which converts a baseband analog signal to a digital signal;
a symbol timing recovery unit, which detects a point, at which a correlation value of a first or second training symbol included in an output signal of the A/D converter is maximum, and determines the point as a start of an OFDM symbol or detects points, at which correlation values of the respective first and second training symbols included in the output signal of the A/D converter are maximum, and determines the start of the OFDM symbol using the detected two points;
a fractional frequency offset estimation unit, which estimates a frequency offset smaller than subcarrier spacing using the training signal included in the output signal of the A/D converter;
a first multiplier, which multiplies an exponential function correcting the estimated fractional frequency offset by the output signal of the AID converter;
a guard interval eliminator, which eliminates a guard interval from the OFDM symbol based on the start of the OFDM symbol;
a fast Fourier transform (FFT) unit, which receives and converts N serial data, from which the guard interval has been eliminated, to parallel data and performs FFT on the parallel data;
an even frequency offset estimation unit, which estimates the even part of a frequency offset using the fast Fourier transformed training signal and previously stored conjugates of respective first and second difference signals;
a subcarrier cyclic shifter, which cyclic shifts the fast Fourier transformed OFDM symbol by the estimated even part of the frequency offset to correct an even frequency offset;
a channel estimator, which obtains channel gain using a ratio between a previously stored fast Fourier transformed training signal and the received fast Fourier transformed training signal; and
a channel equalizer, which divides an output signal of the subcarrier cyclic shifter by the channel gain.

10. The OFDM receiver of claim 9, wherein the symbol timing recovery unit and the fractional frequency offset estimation unit share:
an N/2 sample delay block, which delays at least one of the first and second training symbols included in the output signal of the A/D converter by an N/2-sample data period;
a first conjugate complex number converter, which obtains conjugates of data within at least one of the first and second training symbols included in the output signal of the A/D converter;
a second multiplier, which multiplies an output signal of the N/2 sample delay block by an output signal of the first conjugate complex number converter to obtain a correlation value;
a third multiplier, which selectively multiplies an output signal of the second multiplier by 1 or −j; and
a first moving average calculator, which calculates an average correlation value with respect to an output signal of the third multiplier during a predetermined period,
the symbol timing recovery unit comprises:
a real part selector, which takes the real part of an output signal of the first moving average calculator;
a maximum value detector, which detects at least one among a first estimate value $d_1$ giving a maximum correlation value of the first training symbol and a second estimate value $d_2$ giving a maximum correlation value of the second training symbol; and
a symbol start determiner, which determines the first estimate value or an average of the first and second estimate values as the start of the OFDM symbol, and
the fractional frequency offset estimation unit comprises:
a first phase detector, which detects a phase of an average correlation value of the first training symbol and a phase of an average correlation value of the second training symbol from the output signal of the first moving average calculator and calculates an average of the detected phases; and
a fourth multiplier, which multiplies the average calculated by the first phase detector by $1/\pi$.

11. The OFDM receiver of claim 10, wherein the even frequency offset estimation unit comprises:

a 2-sample shifter, which cyclic shifts the fast Fourier transformed first training symbol and the fast Fourier transformed second training symbol by a 2-sample data period;

a second conjugate complex number converter, which obtains a conjugate of the fast Fourier transformed first training symbol and a conjugate of the fast Fourier transformed second training symbol;

a fifth multiplier, which multiplies output data of the 2-sample shifter by output data of the second conjugate complex number converter;

a difference signal storage block, which stores the conjugate $D^*_1(k)$ of the first difference signal $D_1(k)$ defined by a phase difference between adjacent even-numbered subcarriers and the conjugate $D^*_2(k)$ of the second difference signal $D_2(k)$ defined by a phase difference between adjacent odd-numbered subcarriers;

a sixth multiplier, which multiplies data that is output from the fifth multiplier with respect to the first training symbol by the conjugate of the first difference signal, and multiplies data that is output from the fifth multiplier with respect to the second training symbol by the conjugate of the second difference signal;

a second moving average calculator, which calculates an average of the output data of the sixth multiplier during a 1-symbol period;

a second phase detector, which detects a phase of an average obtained with respect to the first training symbol and a phase of an average obtained with respect to the second training symbol; and an even frequency offset estimator, which estimates an even value, which is closest to the result of multiplying a difference between the detected phases by $M/2\pi$, as the even frequency offset.

12. The OFDM receiver of claim 9, wherein the even frequency offset estimation unit comprises:

a 2-sample shifter, which cyclic shifts the fast Fourier transformed first training symbol and the fast Fourier transformed second training symbol by a 2-sample data period;

a second conjugate complex number converter, which obtains a conjugate of the fast Fourier transformed first training symbol and a conjugate of the fast Fourier transformed second training symbol;

a fifth multiplier, which multiplies output data of the 2-sample shifter by output data of the second conjugate complex number converter;

a difference signal storage block, which stores the conjugate $D^*_1(k)$ of the first difference signal $D_1(k)$ defined by a phase difference between adjacent even-numbered subcarriers and the conjugate $D^*_2(k)$ of the second difference signal $D_2(k)$ defined by a phase difference between adjacent odd-numbered subcarriers;

a sixth multiplier, which multiplies data that is output from the fifth multiplier with respect to the first training symbol by the conjugate of the first difference signal, and multiplies data that is output from the fifth multiplier with respect to the second training symbol by the conjugate of the second difference signal;

a second moving average calculator, which calculates an average of the output data of the sixth multiplier during a 1-symbol period;

a second phase detector, which detects a phase of an average obtained with respect to the first training symbol and a phase of an average obtained with respect to the second training symbol; and an even frequency offset estimator, which estimates an even value, which is closest to the result of multiplying a difference between the detected phases by $M/2\pi$, as the even frequency offset.

* * * * *